United States Patent [19]

Denley

[11] Patent Number: 5,390,089
[45] Date of Patent: Feb. 14, 1995

[54] DUAL COORDINATE HEADLAMP ADJUSTER

[75] Inventor: Ronald S. Denley, Woodstock, Ill.

[73] Assignee: Elco Industries, Inc., Rockford, Ill.

[21] Appl. No.: 69,737

[22] Filed: Jun. 1, 1993

[51] Int. Cl.⁶ .............................................. B60Q 1/04
[52] U.S. Cl. ..................... 362/66; 362/273; 362/289; 362/423; 362/428
[58] Field of Search ..... 362/61, 66, 80, 273, 362/271, 284, 289, 423, 428

[56] References Cited

U.S. PATENT DOCUMENTS

| | | | |
|---|---|---|---|
| 4,674,013 | 6/1987 | Manzoni | 362/66 |
| 4,713,739 | 12/1987 | Ryder et al. | 362/289 X |
| 4,737,891 | 4/1988 | Burton | 362/61 |
| 5,023,759 | 6/1991 | Eckenrode | 362/289 X |
| 5,214,971 | 6/1993 | Burton et al. | 362/66 |
| 5,319,529 | 6/1994 | Lukkarinen et al. | 362/66 |
| 5,321,589 | 6/1994 | Shinkawa et al. | 362/66 |
| 5,321,590 | 6/1994 | Wu | 362/66 |

Primary Examiner—Ira S. Lazarus
Assistant Examiner—Thomas M. Sember
Attorney, Agent, or Firm—Leydig, Voit & Mayer, Ltd.

[57] ABSTRACT

An adjuster for adjusting a headlamp component along mutually perpendicular coordinates includes an eccentric connected to a threaded shaft and adapted to be rotated to adjust the headlamp component along one coordinate when a toothed wheel on the shaft is turned by a Phillips screwdriver. By using the screwdriver to turn a second toothed wheel on the shaft, the shaft and the eccentric are moved linearly to effect adjustment of the headlamp component along the second coordinate.

7 Claims, 2 Drawing Sheets

DUAL COORDINATE HEADLAMP ADJUSTER

BACKGROUND OF THE INVENTION

This invention relates generally to adjusters for vehicular headlamp components and, more particularly, for a headlamp component which may require adjustment along two mutually perpendicular coordinates.

SUMMARY OF THE INVENTION

The general aim of the present invention is to provide a single adjuster capable of moving the headlamp component along either of two mutually perpendicular coordinates, the adjuster being of extremely simple and compact construction and being capable of being operated with a standard screwdriver.

A more detailed object of the invention is to achieve the foregoing by providing an adjuster having a carriage adapted to be connected to the headlamp component and supported by a housing to move along mutually perpendicular coordinates. Disposed in the housing is a shaft which, when turned, effects adjustment of the carriage along one coordinate. An axially constrained nut is threadably coupled to the shaft and, when the nut is turned, the shaft is shifted linearly to adjust the carriage along the other coordinate. Toothed wheels are associated with the shaft and the nut to enable those components to be turned by a screwdriver inserted into the housing.

The invention also resides in the provision of means for preventing turning of the nut relative to the shaft during rotation of the shaft and to prevent rotation of the shaft during turning of the nut.

These and other objects and advantages of the invention will become more apparent from the following detailed description when taken in conjunction with the accompanying drawings.

DETAILED DESCRIPTION OF THE PREFERRED EMBODIMENT

Figure 1:
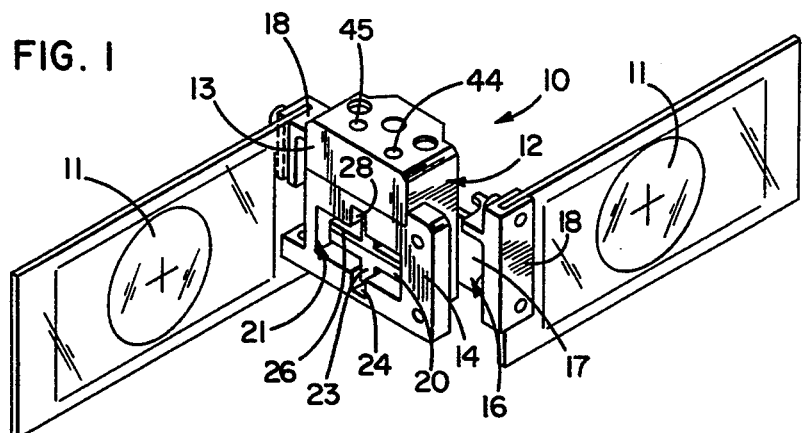
FIG. 1 is a perspective view schematically showing headlamp components adapted to be adjusted by a new and improved adjuster incorporating the unique features of the present invention.
Figure 2:
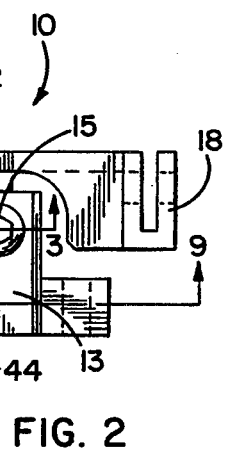
FIG. 2 is an enlarged top plan view of the adjuster.

As shown in the drawings for purposes of illustration, the invention is embodied in apparatus 10 for adjusting headlamp components 11 along two mutually perpendicular coordinates. The headlamp components have been illustrated only schematically and herein have been shown as being a pair of plastic lenses. The lenses 11 are mounted in a headlamp unit which is coupled by a fiber optic cable to a central light control. None of the lighting components except the lenses has been illustrated since they form no part of the present invention.

Herein, the adjuster 10 includes a plastic housing 12 adapted to be secured in a fixed position. The housing is defined by upper and lower box-like sections 13 and 14 which are fastened to one another by two screws 15.

A plastic carriage 16 is supported by the lower section 14 of the housing 12 and includes an upright plate 17 whose front and rear ends are formed with brackets 18 adapted to be connected to the headlamp components 11. The carriage also includes a body 20 integral with the plate and extending inwardly from the plate and into an opening 21 formed in the sides of the lower housing section 14 and extending laterally through that section.

Figure 3:
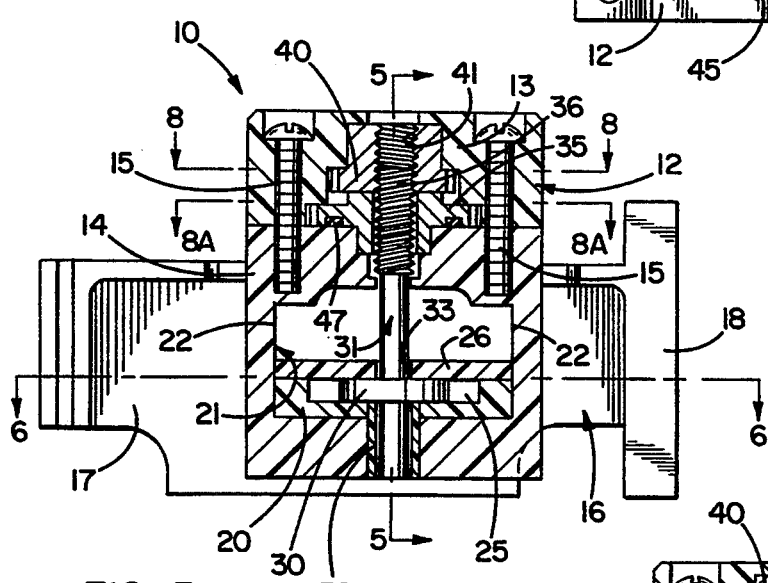
FIG. 3 is a cross-section taken substantially along the line 3—3 of FIG. 2.
Figure 4:
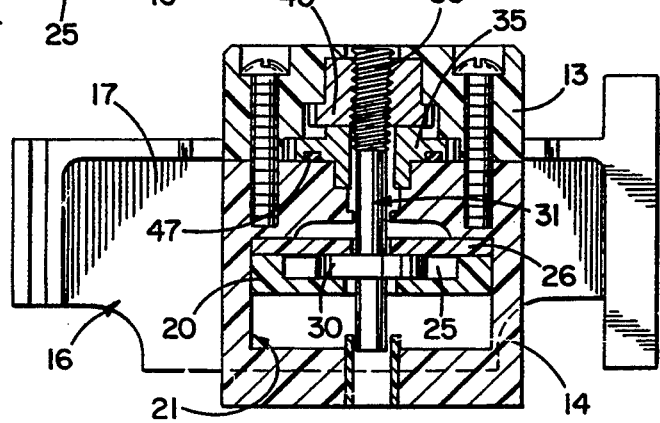
FIG. 4 is a view similar to FIG. 3 but shows certain components of the adjuster in moved positions.
Figure 5:
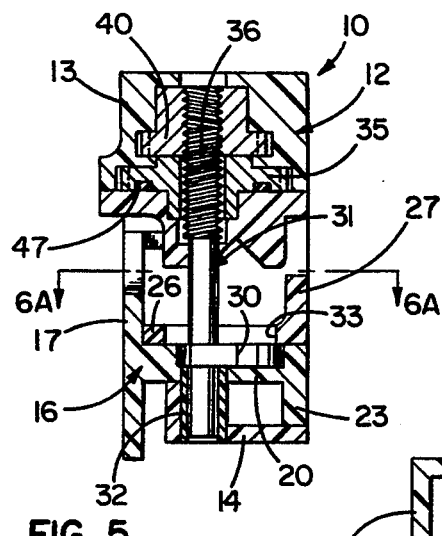
FIGS. 5 and 6 are cross-sections taken substantially along the lines 5—5 and 6—6, respectively, of FIG. 3.
Figure 6A:
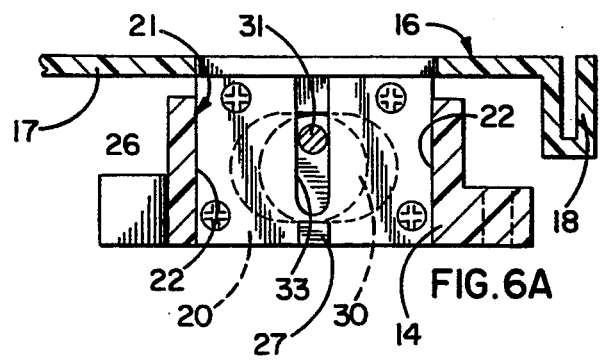
FIG. 6A is a cross-section taken substantially along the line 6A—6A of FIG. 5.
Figure 6:
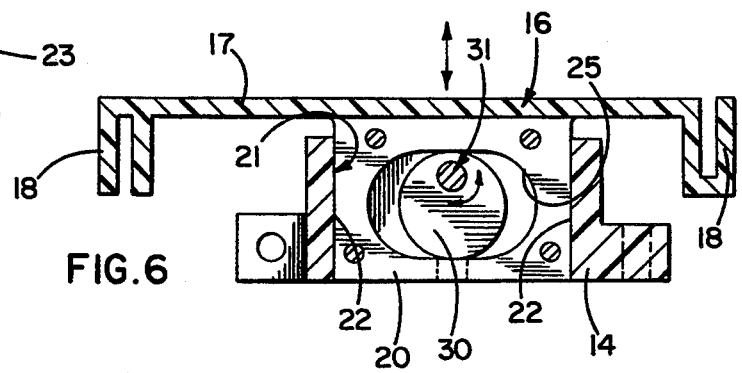
Figure 7:
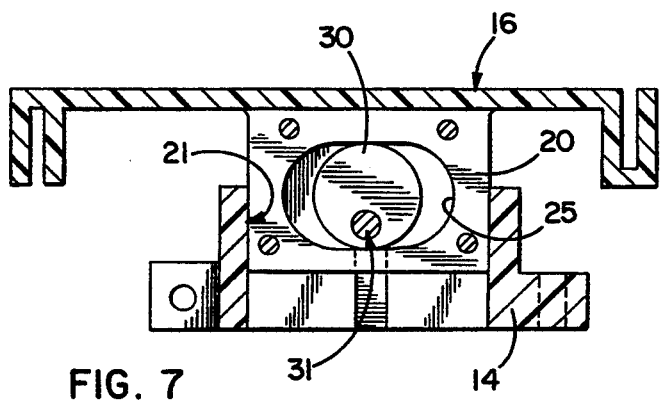
FIG. 7 is a view similar to FIG. 6 but shows certain components of the adjuster in moved positions.

In accordance with the present invention, the carriage 16 is supported by the housing 12 for movement along two mutually perpendicular coordinates and is adapted to be adjusted along those coordinates by extremely simple, compact and easy to adjust components located within the housing. For this purpose, the body 20 of the carriage 16 is supported and guided by the sidewalls 22 (FIGS. 3 and 6) of the opening 21 to slide upwardly and downwardly and also to slide back and forth along a laterally extending horizontal coordinate. A tab 23 (FIG. 9) is molded integrally with the body 20 and projects downwardly into an upwardly opening slot 24 in the lower housing section 14 to stabilize and help guide the body. The body is formed with an upwardly opening and generally racetrack-shaped recess 25 (FIG. 6) which is closed by a plastic cap 26 secured rigidly to the upper end of the body, the recess thus defining a chamber. The cap 26 also is guided for vertical and lateral sliding by the sidewalls 22 of the opening 21 and is formed with an upwardly projecting tab guide 27 (FIG. 9) which fits into a downwardly opening slot 28 in the lower housing section 14. The tabs 23 and 27 coact with the slots 24 and 28, respectively, to prevent the body and cap from rotating about a vertical axis.

In carrying out the invention, an eccentric 30 (FIGS. 3–7) is rotatably supported in the chamber 25 and is captivated against vertical movement therein by the carriage body 20 and cap 26. The eccentric 30 is simply a disc-like member and, when it is shifted downwardly, it bears against the body 20 to move the carriage 16 downwardly. When shifted upwardly, the eccentric 30 bears against the cap 26 to move the carriage upwardly. Upon being rotated about an axis offset radially from its geometrical center, the eccentric bears against one or the other of the straight walls of the chamber 25 to cause the carriage to shift laterally in either an inward direction or an outward direction. Accordingly, vertical adjustment of the carriage, and thus the headlamp components 11, is effected by shifting the eccentric vertically while in and out lateral adjustment of the carriage and the headlamp components is effected by rotating the eccentric.

To effect vertical shifting and rotation of the eccentric 30, the latter is fixed rigidly to a vertically extending shaft 31 whose lower end portion is journaled by a bushing 32 (FIG. 3) in the lower housing section 14. The shaft extends through the eccentric 30 at a location offset radially from the geometric center of the eccentric and the chamber 25 so as to cause the eccentric to act against the straight walls of the chamber with a camming action when the shaft is turned. To accommodate lateral movement of the carriage 16 relative to the shaft 31, the cap 26 of the carriage is formed with a laterally elongated slot 33 (FIGS. 5 and 6A) which receives the shaft and allows the carriage to shift laterally of the shaft. It will be appreciated that the shaft and the eccentric could be formed as a one-piece unit.

In carrying out the invention, an operating member in the form of a toothed wheel 35 is fixed to the shaft 31 to rotate the latter when the wheel is turned. The wheel 35 is captivated axially between the upper and lower housing sections 13 and 14 and, in this instance, is secured to an upper threaded portion 36 of the shaft. The wheel 35 is coupled to rotate the shaft and to allow the shaft to slide axially relative to the wheel. For this purpose, the wheel 35 is formed with an unthreaded shaft-receiving hole 37 (FIG. 8A) which is of a so-called double D-shape and which fits onto a correspondingly shaped section of the threaded portion 36 of the shaft. As a result, rotation of the wheel 35 effects rotation of the shaft but the shaft is capable of sliding upwardly and downwardly within the wheel.

Figure 8A:
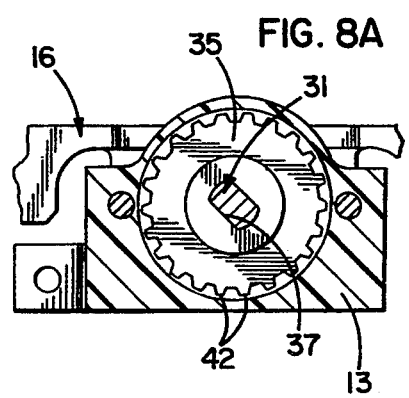
FIGS. 8 and 8A are fragmentary cross-sections taken substantially along the lines 8—8 and 8A—8A, respectively, of FIG. 3.
Figure 8:
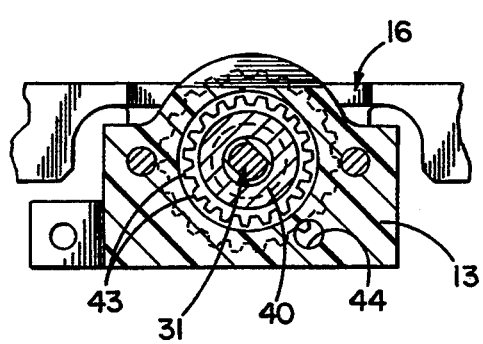

Another operating member in the form of a second toothed wheel 40 is formed with internal threads 41 (FIG. 3) and is threadably coupled to the threaded upper end portion 36 of the shaft 31. The wheel 40 is smaller in diameter than the wheel 35 and is captivated axially between the wheel 35 and the upper housing section 13. The outer peripheries of the wheels 35 and 40 are formed with angularly spaced teeth 42 and 43, respectively (FIGS. 8 and 8A). An access hole 44 in the top wall of the top housing section 14 is generally radially aligned with the teeth 42 of the wheel 35 while an angularly spaced access hole 45 is generally radially aligned with the teeth 43 of the wheel 40.

The adjuster 10 is completed by frictional retarding means which herein comprise a rubber O-ring 47 (FIG. 3) seated in a groove in the lower side of the toothed wheel 35. The O-ring engages the upper side of the lower housing section 14 and frictionally retards rotation of the wheel 35.

With the foregoing arrangement, horizontal adjustment of the headlamp components 11 may be effected by inserting the shank of a Phillips screwdriver 50 (FIG. 9) into the access hole 44 and placing the head of the driver between adjacent teeth 42 of the wheel 35, the circular pitch of the teeth matching the screwdriver head. By then turning the driver, the shaft 31 and the eccentric 30 may be turned to cause the eccentric to cam against one of the straight walls of the chamber 25 and thus move the carriage 16 either inwardly or outwardly in a lateral horizontal direction (compare FIGS. 6 and 7). The screwdriver may be rotated in either direction to effect the lateral adjustment by means of the eccentric. During rotation of the shaft by the screwdriver and the toothed wheel 35, the friction between the threads 41 of the toothed wheel 40 and the threads of the threaded portion 36 of the shaft prevents the toothed wheel 40 from rotating relative to the shaft and changing the vertical position of the eccentric and the carriage.

Figure 9:
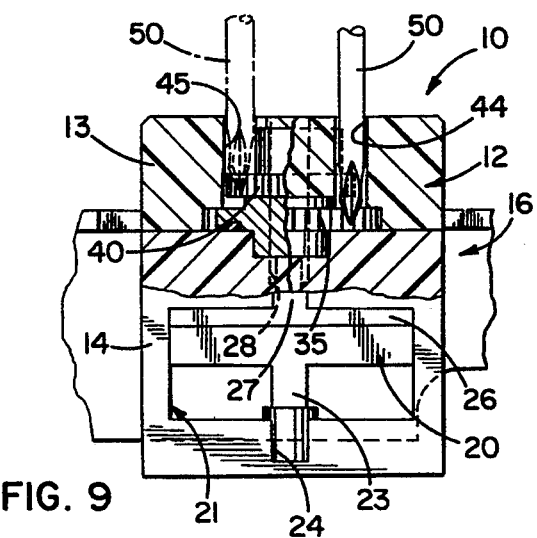
FIG. 9 is a fragmentary cross-section taken substantially along the line 9—9 of FIG. 2.

To adjust the headlamp components 11 vertically, the screwdriver 50 is inserted through the access hole 45 as shown in phantom lines in FIG. 9 and its head is placed between adjacent teeth 43 of the wheel 40. The screwdriver then is turned to rotate the wheel and cause the threads 41 to coact with the threaded shaft portion 36 and effect vertical translation of the shaft, the eccentric 30 and the carriage 16 (compare FIGS. 3 and 4). The screwdriver may be turned in one direction to shift the carriage upwardly and in the opposite direction to shift the carriage downwardly. The friction between the O-ring 47 on the wheel 35 and the top of the lower housing section 14 is greater than the friction between the threads 36 and 41 and thus the wheel 35, the shaft 31 and the eccentric 30 are held rotationally stationary when the wheel 40 is turned to effect the vertical adjustment.

From the foregoing, it will be apparent that the present invention brings to the art a new and improved dual coordinate headlamp component adjuster 10 which is of simple and compact construction and which is capable of being actuated by a standard screwdriver 50. Since the adjustments are effected by turning the wheels 35 and 40 about a common axis, there is no need for right-angle gears or the like.

I claim:

1. A device for adjusting a headlamp component along first and second mutually perpendicular coordinates, said device comprising a housing, a carriage attachable to the headlamp component and supported by said housing to move linearly back and forth along each of said coordinates, a shaft supported by said housing for rotation about a predetermined axis and for linear movement along said axis, an eccentric fixed to said shaft and operable when rotated to move said carriage along said first coordinate, said eccentric being operable when shifted along said axis to move said carriage along said second coordinate, a first operating member coupled to said shaft and operable when rotated to rotate said shaft and said eccentric without moving the shaft and the eccentric linearly along said axis, and a second operating member coupled to said shaft and operable when rotated to cause said shaft and said eccentric to move linearly along said axis without rotating said shaft and said eccentric.

2. A device as defined in claim 1 in which said shaft includes a threaded portion, said shaft being coupled to rotate in unison with said first operating member and to slide linearly relative to said first operating member, said second operating member being internally threaded and being threadably coupled to the threaded portion of said shaft so as to cause said shaft to move linearly in response to rotation of said second operating member.

3. A device as defined in claim 2 further including means retarding rotation of said shaft with a frictional force which is greater than the frictional force retarding rotation of said second operating member on the threaded portion of said shaft.

4. A device as defined in claim 3 in which said means comprise a frictional surface on said first operating member and frictionally engaging a surface of said housing.

5. A device as defined in claim 1 in which said first operating member is a toothed wheel, and an opening in said housing and permitting a tool to be inserted into said housing and between adjacent teeth of said wheel, turning of said tool acting against said teeth to effect turning of said wheel.

6. A device as defined in claim 1 in which said second operating member is a toothed wheel, and an opening in said housing and permitting a tool to be inserted into said housing and between adjacent teeth of said wheel, turning of said tool acting against said teeth to effect turning of said wheel.

7. A device as defined in claim 1 in which said first and second operating members comprise first and second toothed wheels, respectively, said wheels being of different diameters, and first and second spaced openings in said housing and each aligned generally with the periphery of the respective wheel, each opening permitting a tool to be inserted into said housing and between adjacent teeth of the respective wheel whereby turning of said tool effects turning of the wheel.

* * * * *